Patented Oct. 13, 1925.

1,557,181

UNITED STATES PATENT OFFICE.

ADOLPH MESSMER, OF SAN FRANCISCO, CALIFORNIA.

PROCESS OF MAKING CASEIN.

No Drawing.    Application filed May 26, 1923. Serial No. 641,749.

*To all whom it may concern:*

Be it known that I, ADOLPH MESSMER, a citizen of Switzerland, and a resident of the city and county of San Francisco, State of California, have invented a certain new and useful Process of Making Casein, of which the following is a specification.

The invention relates to a process of making casein from milk.

An object of the invention is to provide a process whereby an improved form of product is produced at a lesser cost, than by the process now generally employed.

Another object of the invention is to provide a process for making casein in which all traces of whey are separated from the precipitated curd.

The invention possesses other advantageous features, some of which with the foregoing, I shall set forth at length in the following description, where I shall outline in full one method of carrying out my process.

At the present time, casein is almost invariably manufactured as follows. The curd is precipitated from the milk either by natural precipitation or by the addition of a dilute acid to the milk, while the milk is held at a temperature between 110° F. and 115° F. After the curd has been precipitated, the whey is drawn off and the curd is then washed in the precipitating vat by several rinsings with cold or warm water, the curd being stirred by hand while it is immersed in the washing water. This washing process is accomplished only with much labor and results in an incomplete separation of the whey from the curd, since the rinsing water does not remove the whey from the inside of the curd lumps. This remaining whey causes a sour casein which is difficult to dissolve, which has a lower adhesiveness than pure casein and which will not stand the borax test.

In accordance with my process I precipitate the curd from the milk in the usual manner, that is, by either natural or acid precipitation while the milk is at a temperature of about 110° F. to 115° F. After the curd has precipitated, the temperature of the mass, that is, the curd and the whey, is quickly raised and held for a short time at between 120° F. and 200° F., during which time the mixture is stirred. I prefer to use a temperature between 120° F. and 130° F., although a somewhat higher temperature may be employed without producing any ill effects. This raising of temperature produces a very firm casein and consequently eliminates losses of material in the following washing and grinding operation. The whey is then drained off from the curd and the curd is flushed into the hopper of a running curd grinder, the precipitating vat being placed at a higher level than the hopper so that the curd flows by gravity from the precipitating vat into the hopper. The stream of curd discharging into the hopper, is broken up and washed by means of a heavy stream of cold water which is discharged under pressure into the hopper and preferably at the incoming curd stream, so that the curd mass is violently agitated by the rapidly moving stream of water. By this operation, all of the curd is torn apart and opened so that the whey, which is lodged in the interstices of the curd, is washed out.

After passing through the curd grinder, in which the curd is broken up, the curd is either collected on a drain rack which is placed below the grinder, to drain off the water, or is led through a trough into a power driven centrifuge which is lined with cheese cloth or other pervious material for the purpose of separating the liquid from the curd. Wash water is applied to the inner surface of the curd as it packs in the driven centrifuge and this wash water is driven through the casein and removes all traces of whey. From the centrifuge the curd, which is perfectly clean and non-adhesive, is discharged into a shelf dryer or rotary dryer, wherein the finished product is produced. The casein comes out of the dryer as a light colored, odorless, sweet product, having a very low ash content and which will pass all of the various tests.

I claim:

1. The method of making casein which comprises precipitating the curd, separating the whey from the curd, discharging the curd from its container in a stream and directing a stream of cold water under pressure into the discharging curd stream, draining the water from the curd and subjecting the curd to centrifugal force and simultaneously applying wash water thereto.

2. The method of making casein which comprises separating the curd from the whey, washing the curd with water and further washing the curd by applying water to the inner surface of a mass of curd while subjected to centrifugal force.

3. The method of making casein which comprises precipitating the curd in the milk, raising the temperature of the mass for a short time during which the mass is agitated, draining the whey from the curd and washing the curd while it is subjected to the action of centrifugal force.

4. The method of making casein which comprises precipitating the curd in the milk, raising the temperature of the mass for a short time during which the mass is agitated, draining the whey from the curd, washing, agitating and breaking up the curd with a stream of water under pressure, separating the water from the curd and then grinding the curd.

5. The method of making casein which comprises precipitating the curd from the milk, raising the temperature of the mass for a short time to a temperature between 120° F., and 200° F., draining the whey from the curd, discharging the curd in a stream from the precipitation vessel to the hopper of a curd grinder, simultaneously introducing a large stream of water under pressure into the hopper to disrupt and wash the curd, grinding the curd and drying the ground curd.

6. The step in the process of making casein which comprises discharging the precipitated curd from the precipitating vessel and simultaneously subjecting it to the action of a large stream of water under pressure.

7. The step in the process of making casein which comprises subjecting the ground casein to the action of centrifugal force and simultaneously applying wash water to the casein.

In testimony whereof I have hereunto set my hand.

ADOLPH MESSMER.